(12) United States Patent
Radford et al.

(10) Patent No.: US 7,566,165 B2
(45) Date of Patent: Jul. 28, 2009

(54) VALVED MANIFOLD AND SYSTEM SUITABLE FOR INTRODUCING ONE OR MORE ADDITIVES INTO A FLUID STREAM

(75) Inventors: Philip T. Radford, Roebuck, SC (US); Jack L. Rolen, Campobello, SC (US)

(73) Assignee: Milliken & Company, Spartanburg, SC (US)

( * ) Notice: Subject to any disclaimer, the term of this patent is extended or adjusted under 35 U.S.C. 154(b) by 649 days.

(21) Appl. No.: 11/405,308

(22) Filed: Apr. 17, 2006

(65) Prior Publication Data

US 2007/0253281 A1 Nov. 1, 2007

(51) Int. Cl.
*B01F 5/04* (2006.01)
*B01F 15/02* (2006.01)

(52) U.S. Cl. ................ 366/173.1; 366/182.4

(58) Field of Classification Search ........... 366/162.4, 366/167.1, 173.1, 173.2, 182.1, 182.4, 138, 366/159.1, 162.5; 137/896–897; 422/131, 422/133–135
See application file for complete search history.

(56) References Cited

U.S. PATENT DOCUMENTS

| | | | |
|---|---|---|---|
| 2,361,150 A * | 10/1944 | Petroe | |
| 3,859,020 A | 1/1975 | Rentz | |
| 4,292,918 A | 10/1981 | Davis et al. | |
| 4,800,921 A | 1/1989 | Greebe | |
| 4,813,603 A | 3/1989 | Takeuchi et al. | |
| 5,047,012 A | 9/1991 | Leuschner et al. | |
| 5,474,102 A | 12/1995 | Lopez | |
| 6,033,104 A | 3/2000 | Althausen | |
| 6,036,898 A | 3/2000 | Sulzbach et al. | |
| 6,065,862 A | 5/2000 | Althausen et al. | |
| 6,083,205 A | 7/2000 | Bourne et al. | |
| 6,127,442 A | 10/2000 | Sulzbach et al. | |
| 6,147,133 A | 11/2000 | Sulzbach et al. | |
| 6,247,839 B1 * | 6/2001 | Kochanowicz et al. | |
| 6,250,795 B1 * | 6/2001 | Kochanowicz et al. | |
| 6,261,486 B1 | 7/2001 | Sulzbach et al. | |
| 6,261,498 B1 | 7/2001 | Sulzbach et al. | |
| 6,358,036 B2 | 3/2002 | Sulzbach et al. | |
| 6,361,723 B1 | 3/2002 | Sulzbach et al. | |

(Continued)

FOREIGN PATENT DOCUMENTS

EP 1 045 753 B1 4/2003

(Continued)

*Primary Examiner*—Charles E Cooley
(74) *Attorney, Agent, or Firm*—Robert M. Lanning

(57) ABSTRACT

A manifold comprises a conduit for conveying a fluid stream, a plurality of nozzles, and a plurality of valves. Each nozzle is connected to a corresponding port in the conduit, and each valve is connected to a corresponding nozzle. The ports can be disposed at discrete locations on two or more transverse planes of the conduit and such that no longitudinal, diametrical plane of the conduit passing through the center point of any one of the ports is coplanar with a longitudinal, diametrical plane of the conduit passing through the center point of a longitudinally adjacent port. Alternatively, the ports can be disposed at discrete locations on the conduit such that no longitudinal, diametrical plane of the conduit passing through the center point of any one of the ports is coplanar with a longitudinal, diametrical plane of the conduit passing through the center point of any other port.

22 Claims, 9 Drawing Sheets

U.S. PATENT DOCUMENTS

| | | |
|---|---|---|
| 6,523,570 B2 | 2/2003 | Weiss et al. |
| 6,544,481 B1 | 4/2003 | Sulzbach et al. |
| 6,602,971 B2 | 8/2003 | Sulzbach et al. |
| 6,615,700 B2 | 9/2003 | Sulzbach et al. |
| 6,635,200 B2 | 10/2003 | Sulzbach et al. |
| 6,808,378 B2 | 10/2004 | Wirth et al. |
| 6,809,124 B2 | 10/2004 | Sulzbach et al. |
| 6,833,095 B2 | 12/2004 | Sulzbach et al. |
| 6,889,816 B2 | 5/2005 | Willing |
| 7,293,910 B2 * | 11/2007 | Bellasalma et al. |
| 2001/0000452 A1 | 4/2001 | Kochanowicz et al. |
| 2002/0046547 A1 | 4/2002 | Bishop et al. |
| 2005/0076660 A1 | 4/2005 | von Gutfeld |
| 2005/0110183 A1 | 5/2005 | Buchel et al. |
| 2007/0253281 A1 * | 11/2007 | Radford et al. |

FOREIGN PATENT DOCUMENTS

| | | |
|---|---|---|
| JP | 60187325 A * | 9/1985 |
| WO | WO 00/78439 A1 | 12/2000 |

* cited by examiner

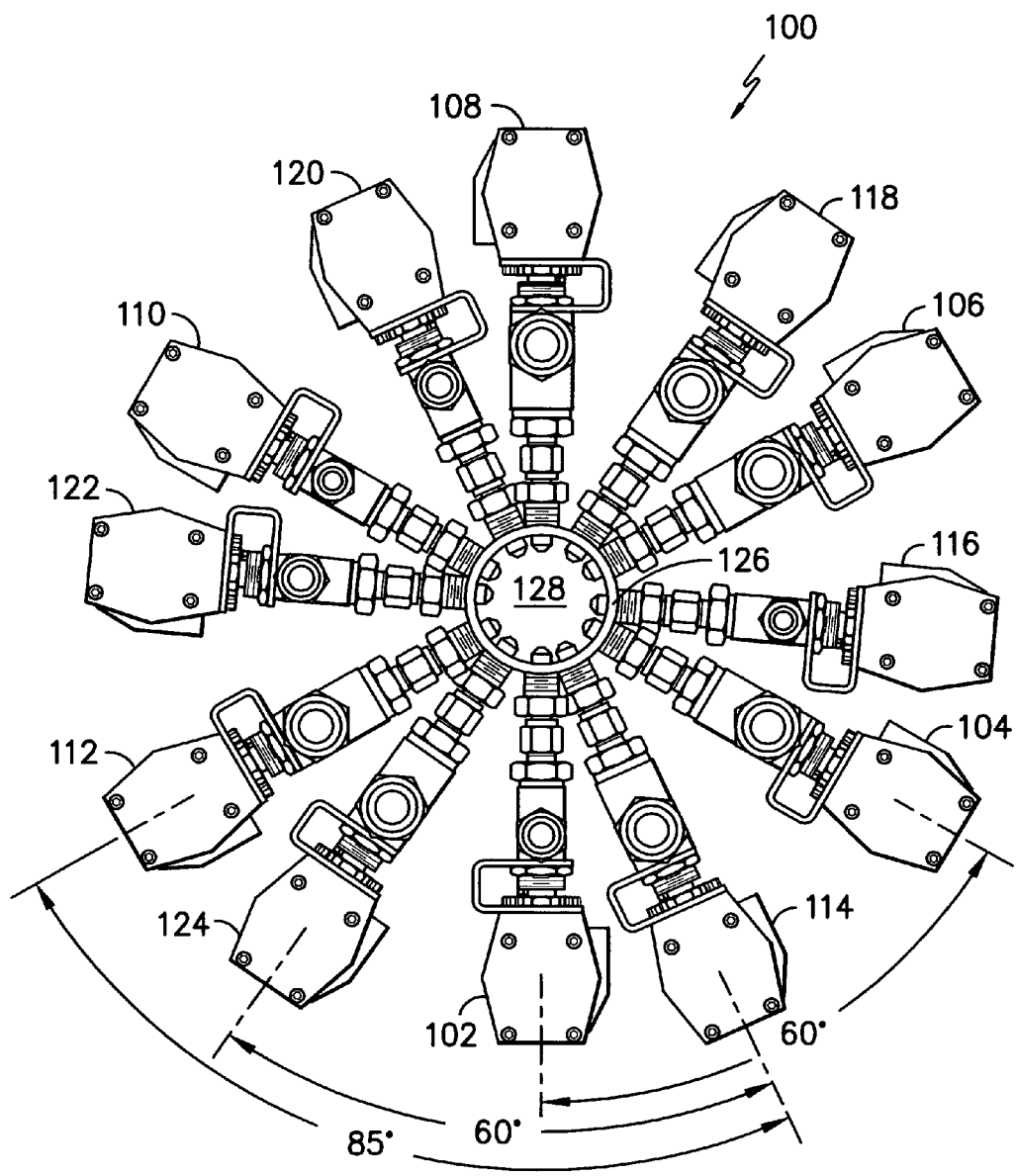
FIG. -1-

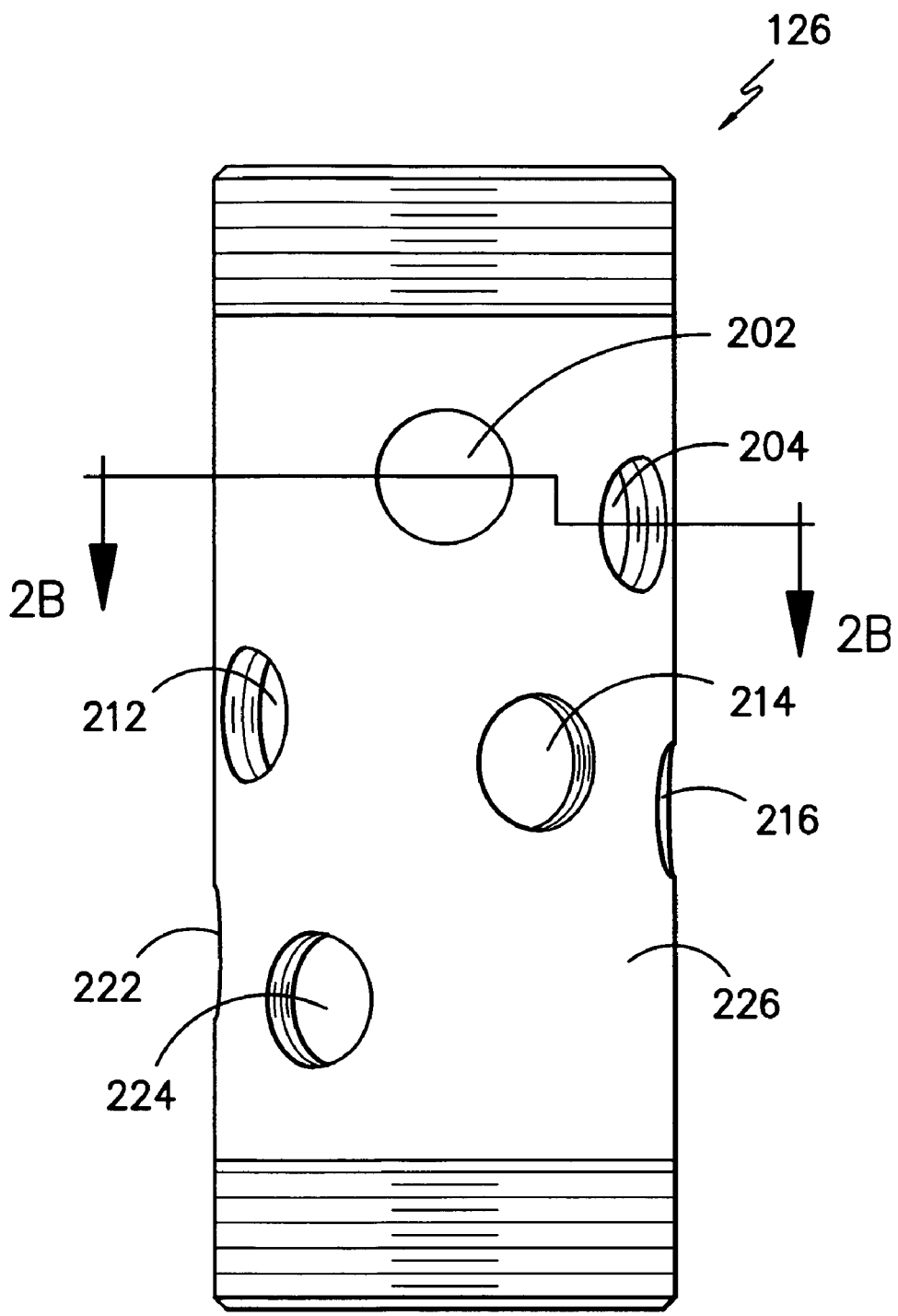
FIG. -2-

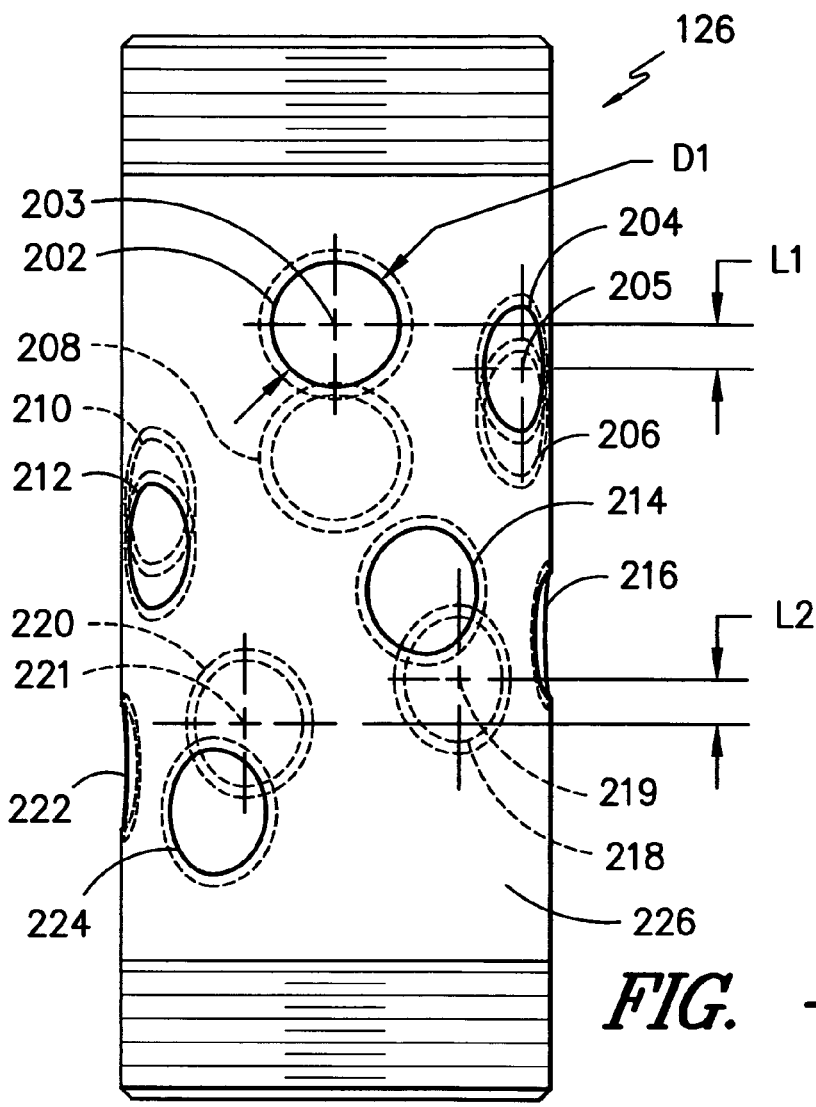
FIG. -2A-
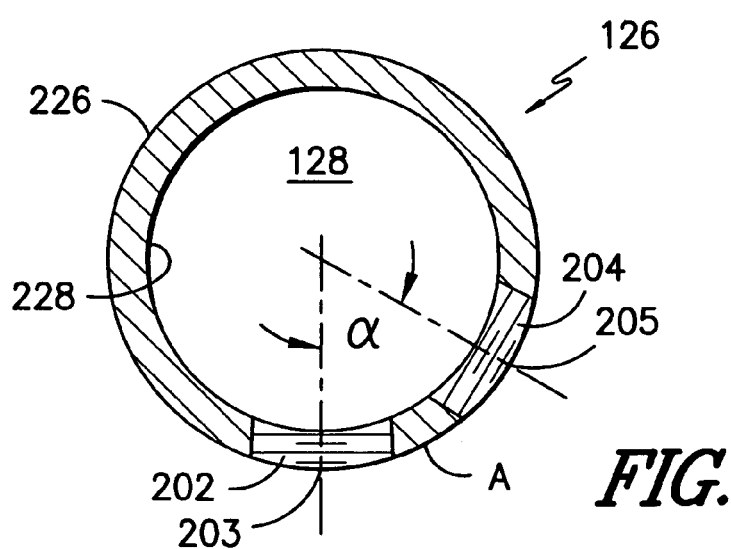
FIG. -2B-

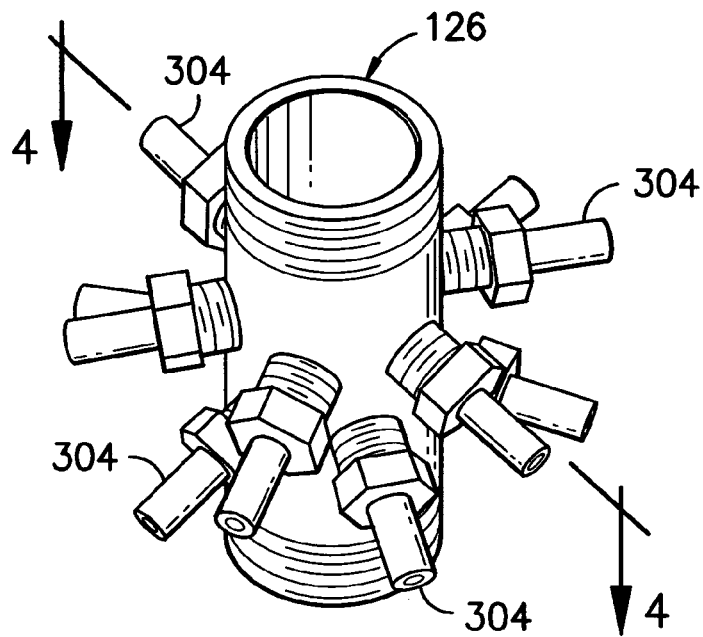
FIG. -3-
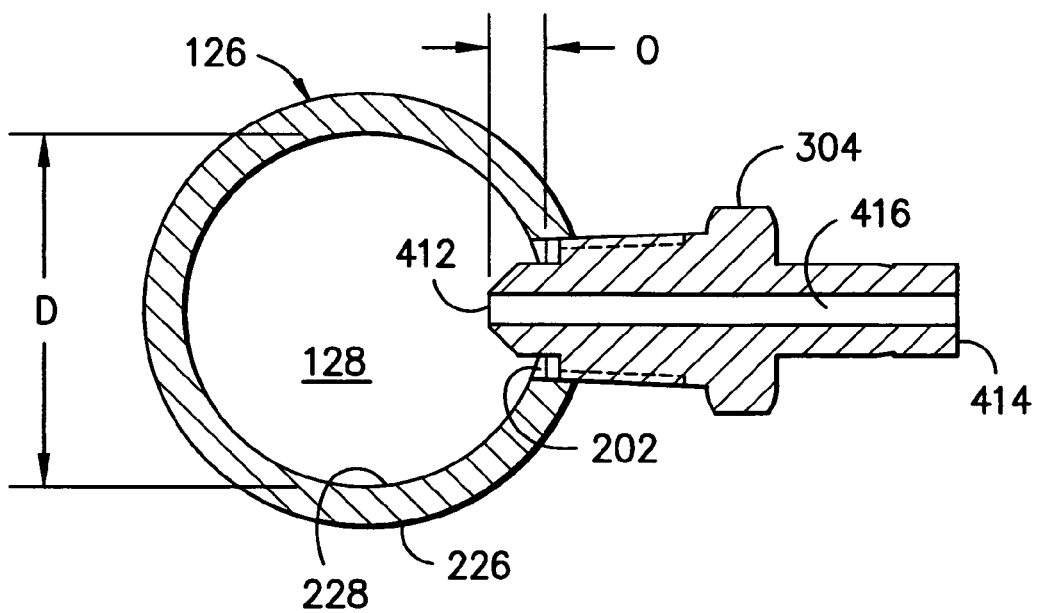
FIG. -4-

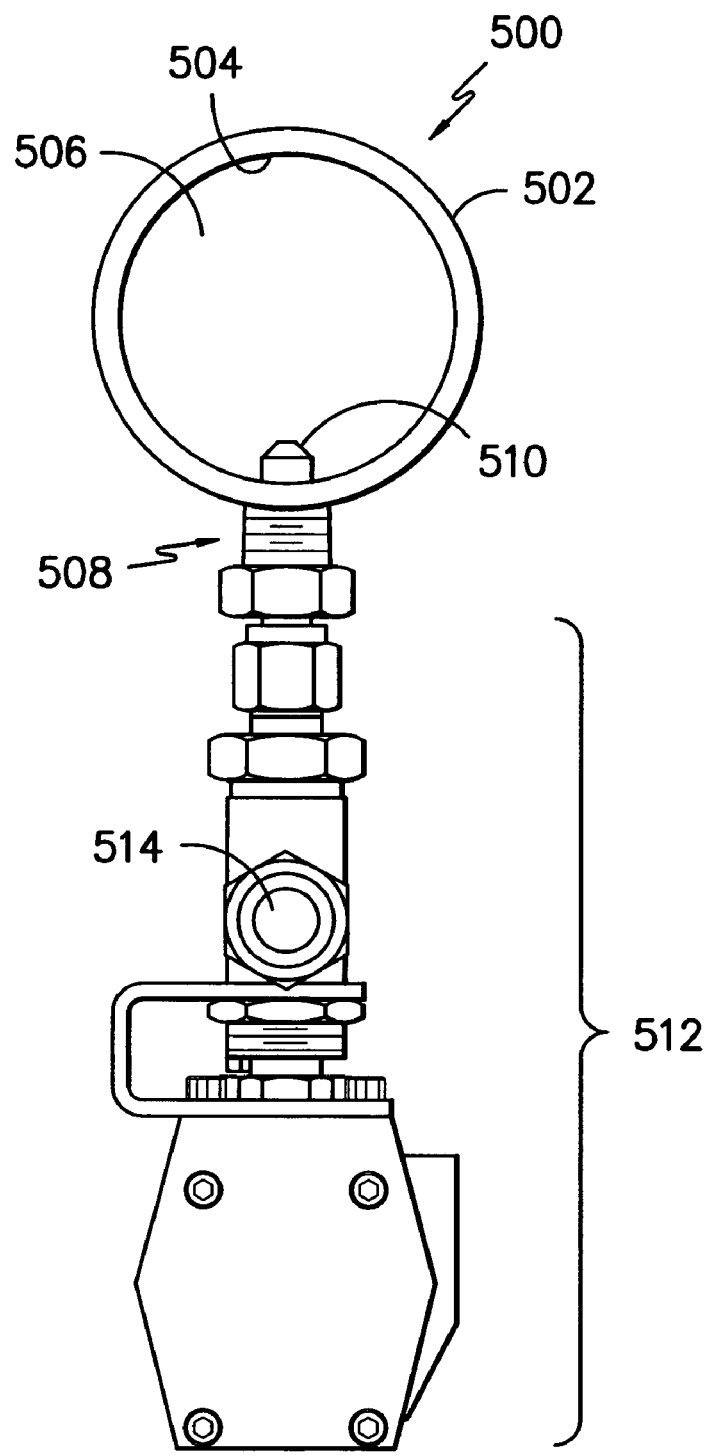
FIG. -5-

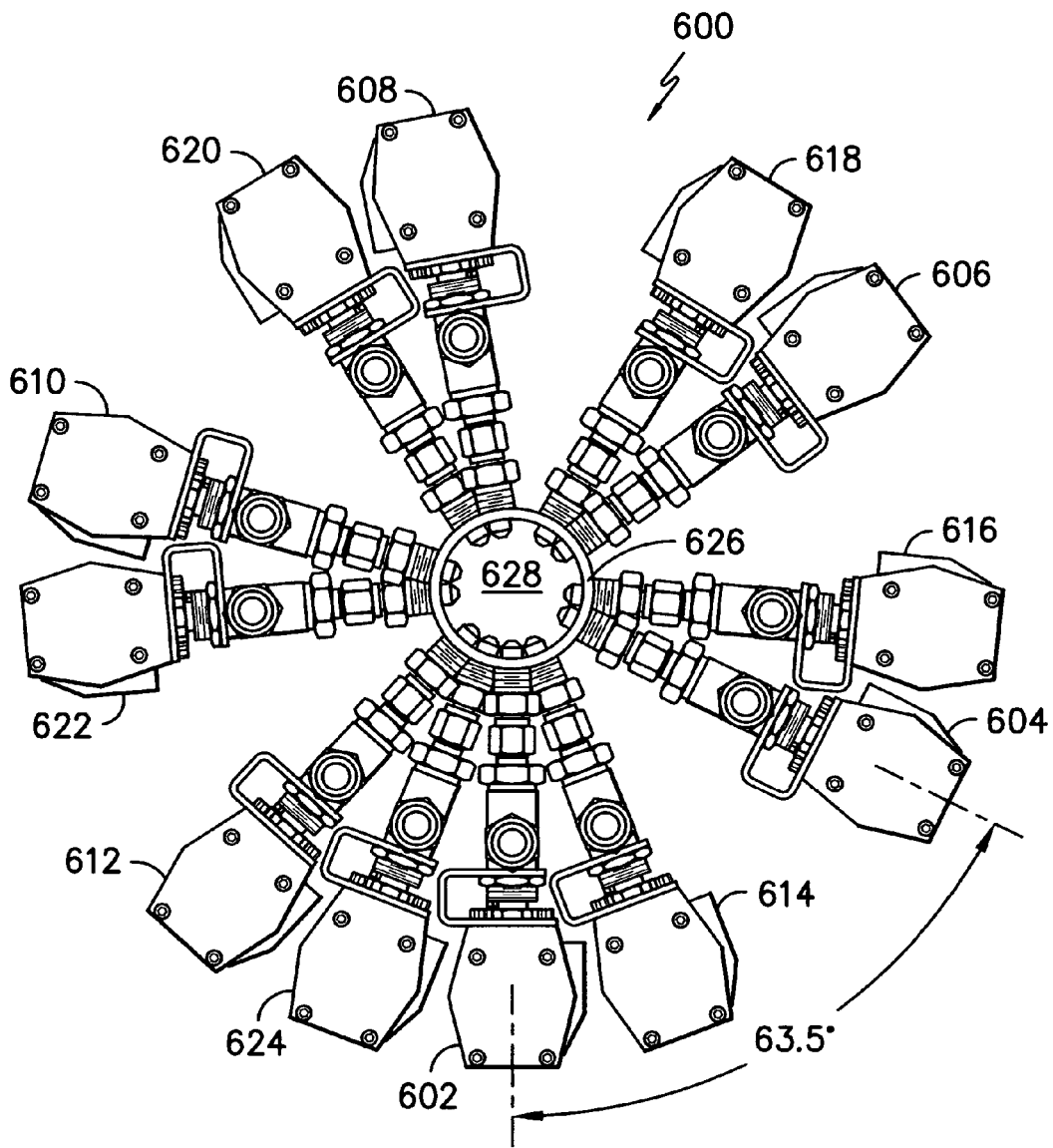
FIG. −6−

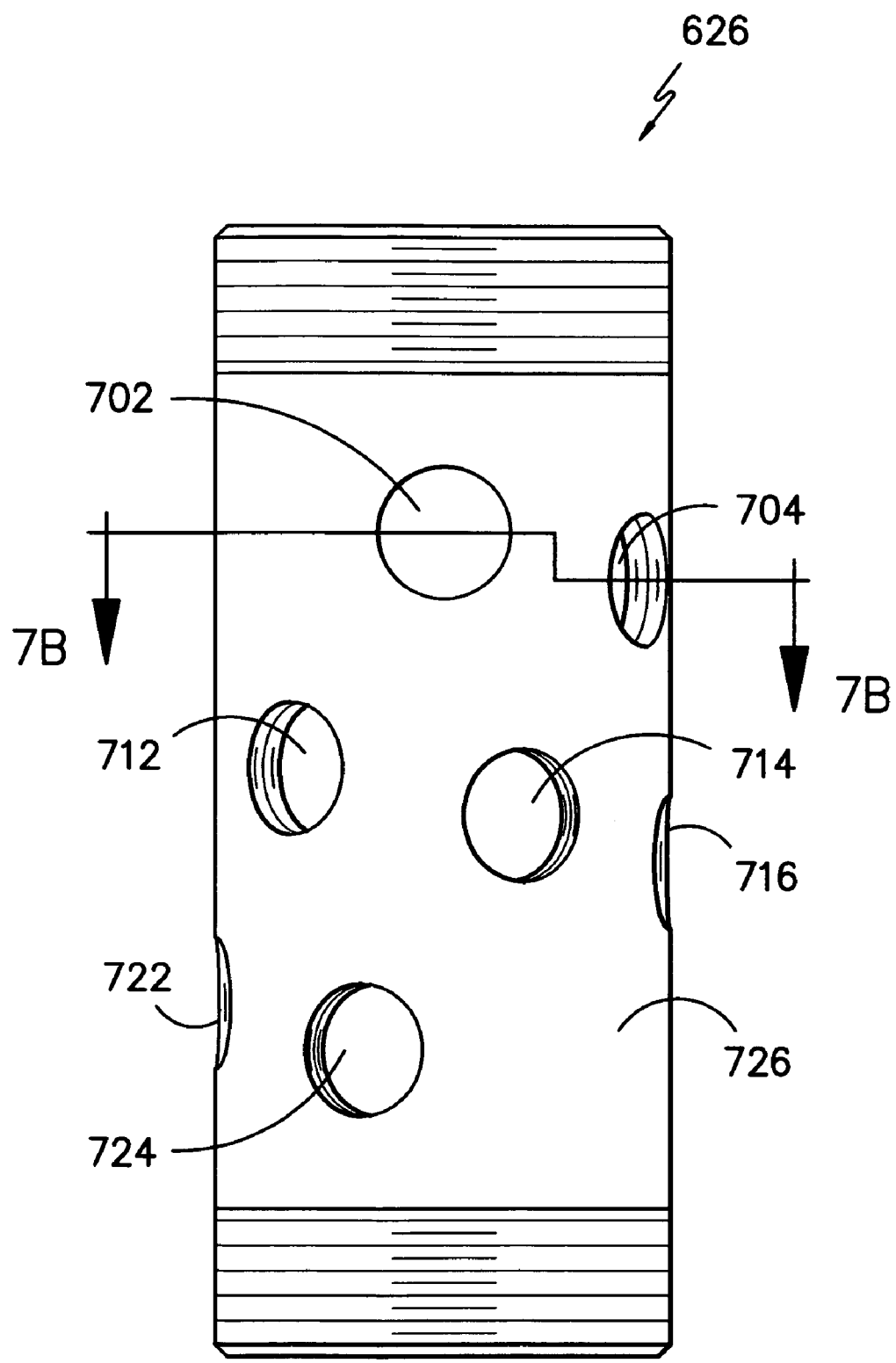
FIG. -7-

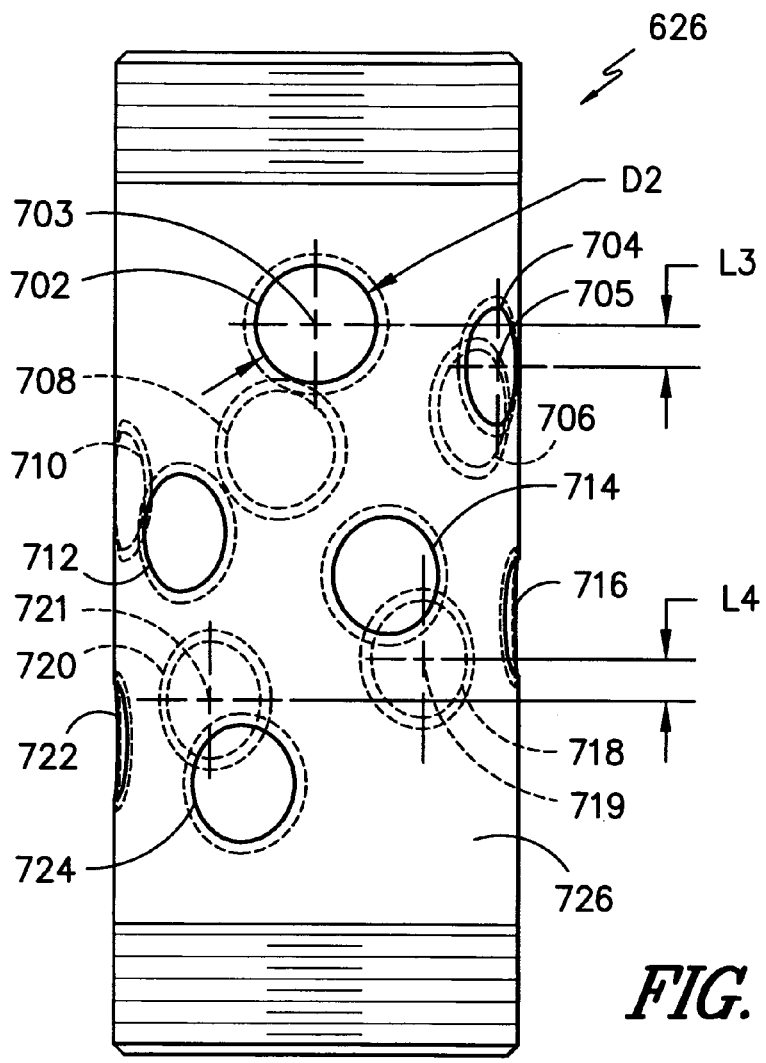
FIG. —7A—
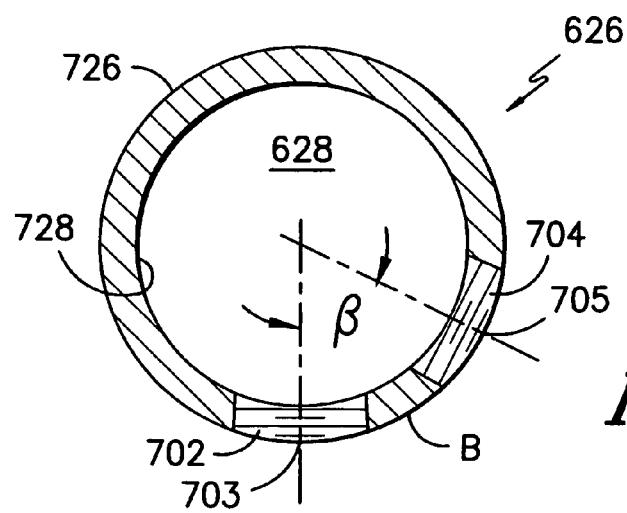
FIG. —7B—

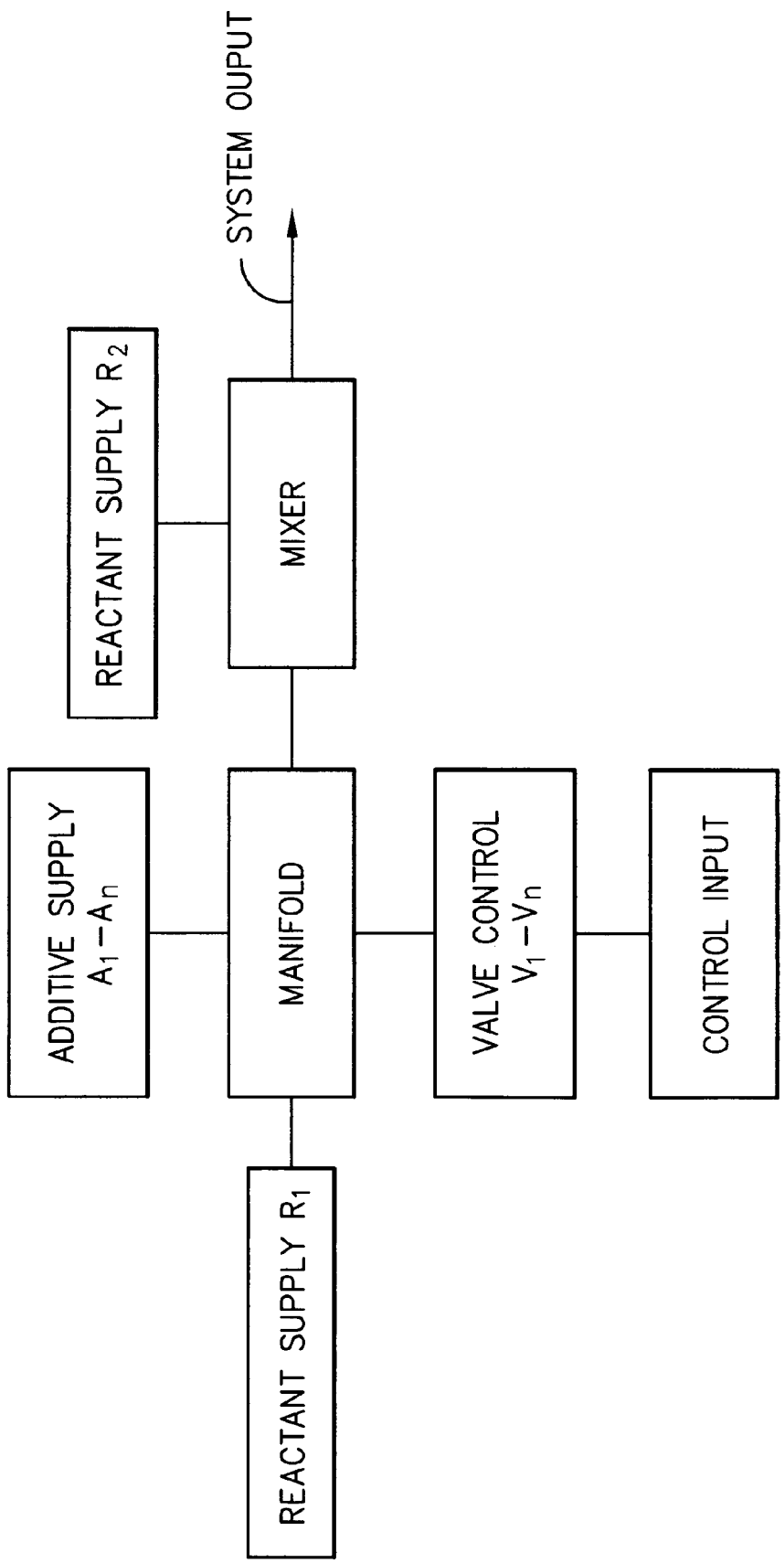
FIG. -8-

VALVED MANIFOLD AND SYSTEM SUITABLE FOR INTRODUCING ONE OR MORE ADDITIVES INTO A FLUID STREAM

BRIEF SUMMARY OF THE INVENTION

The invention provides a manifold suitable for introducing one or more additives (e.g., colorants) into a fluid stream (e.g., a polyol stream), such as that used in the manufacture of, for example, a polymer material or foam. The manifold comprises a conduit for conveying the fluid stream, a plurality of nozzles, and a plurality of valves connected to the nozzles. The conduit has a length and a flowpath extending along the length thereof and comprises an exterior wall defining a surface of the conduit, an interior wall defining the diameter of the flowpath, and a plurality of ports extending from the exterior wall to the interior wall of the conduit. Each nozzle is connected to a respective port on the conduit and has a distal end, a proximal end, and a duct connecting the distal and proximal ends thereof. The distal end of each nozzle projects inward from the interior wall of the conduit and is disposed in the flowpath of the conduit to permit fluid communication between the duct and the flowpath. Each valve is operatively connected to the distal end of a respective nozzle, is in fluid communication with the duct of the respective nozzle, and is adapted to introduce at least one additive into the duct of the nozzle and into the flowpath of the conduit.

In certain possibly preferred embodiments, each of the ports in the conduit has a center point and is disposed at a discrete location about the diameter of the flowpath and along the length of the conduit such that the center points of the ports are disposed on two or more transverse planes of the conduit. The ports can also be positioned so that no longitudinal, diametrical plane of the conduit passing through the center point of any one of the ports is coplanar with a longitudinal, diametrical plane of the conduit passing through the center point of a longitudinally adjacent port.

In certain other possibly preferred embodiments, each of the ports has a center point and is disposed at a discrete location about the diameter of the flowpath and along the length of the conduit such that no longitudinal, diametrical plane of the conduit passing through the center point of any one of the ports is coplanar with a longitudinal, diametrical plane of the conduit passing through the center point of any other port.

In certain other embodiments, the invention further provides a system suitable for introducing one or more additives into a fluid stream, such as that used in the manufacture of a polymer foam. The system comprises a manifold according to the invention, a valve control assembly adapted to selectively and independently open and close each of the valves, and at least one additive supply adapted to deliver at least one additive to each of the valves.

BRIEF DESCRIPTION OF THE DRAWINGS

FIG. 1 is a top view of a manifold according to the invention.

FIG. 2 is a plan view of the conduit of the manifold depicted in FIG. 1.

FIG. 2A is a plan view of the conduit of the manifold depicted in FIG. 1 showing both the visible ports and obstructed ports (in phantom).

FIG. 2B is a sectional, top view (along line 2B) of the conduit depicted in FIG. 2.

FIG. 3 is a perspective view of the conduit of the manifold depicted in FIG. 1 showing the nozzles attached thereto.

FIG. 4 is a sectional, top view (along line 4) of the conduit depicted in FIG. 3.

FIG. 5 is a top view of a conduit suitable for use in a manifold of the invention having a nozzle and valve connected thereto.

FIG. 6 is a top view of a manifold according to the invention.

FIG. 7 is a plan view of the conduit of the manifold depicted in FIG. 6.

FIG. 7A is a plan view of the conduit of the manifold depicted in FIG. 7 showing both the visible ports and obstructed ports (in phantom).

FIG. 7B is a sectional, top view (along line 7B) of the conduit depicted in FIG. 7.

FIG. 8 is a schematic depiction of a system incorporating a manifold according to the invention.

DETAILED DESCRIPTION OF THE INVENTION

As depicted in FIG. 1, the manifold 100 comprises an array of nozzle and valve assemblies 102, 104, 106, 108, 110, 112, 114, 116, 118, 120, 122, 124 connected to a plurality of ports 202, 204, 206, 208, 210, 212, 214, 216, 218, 220, 222, 224 (FIG. 2A) disposed about a flowpath 128 defined by a conduit 126. In FIG. 1, the nozzle and valve assemblies are grouped in two sets, a first set containing nozzle and valve assemblies 102, 104, 106, 108, 110, and 112 and a second set containing nozzle and valve assemblies 114, 116, 118, 120, 122, and 124. Within each set, the nozzle and valve assemblies are connected to ports so that the nozzle and valve assemblies are disposed at a desired angle relative to the adjacent nozzle and valve assembly and the flowpath. Thus, as shown in FIG. 1, the nozzle and valve assembly 104 (which is in the first set of nozzle and valve combinations) can be connected to port 204 (FIG. 2) so that it is disposed at an angle of about 60 degrees relative to the adjacent nozzle and valve assembly 102 (which is in the first set of nozzle and valve assemblies) and the flowpath 128. Also, the nozzle and valve assembly 124 (which is in the second set of nozzle and valve assemblies) can be connected to port 224 (FIG. 2) so that it is disposed at an angle of about 60 degrees relative to the adjacent nozzle and valve assembly 114 (which is in the second set of nozzle and valve assemblies) and the flowpath 128. Furthermore, in order to provide an offset between the nozzle and valve combinations of the first set and the second set, the first nozzle and valve assembly of the second set can be connected to a port so that the angle between it and the last nozzle and valve assembly of the first set is different than the angle between the nozzle and valve assemblies of the first and/or second sets. Thus, as shown in FIG. 1, the first nozzle and valve assembly 114 of the second set can be connected to port 214 (FIG. 2) so that the nozzle and valve assembly 114 is disposed at an angle of about 80 to about 100 degrees or about 80 to about 90 degrees (shown at about 85 degrees) relative to the last nozzle and valve assembly 112 of the first set, which is connected to port 212 (FIG. 2). While the manifold is depicted in FIG. 1 with the nozzle and valve combinations set at particular angles, the angles employed can be varied so long as the nozzle and valve assemblies do not physically interfere with each other. Thus, the angle between the nozzle and valve assemblies can be, for example, decreased as the physical dimensions of the nozzle and valve assemblies decreases or can be, for example, increased as the physical dimensions of the nozzle and valve assemblies increases.

In order to provide longitudinal separation between the nozzle and valve assemblies, the ports can be disposed about the flowpath and along the conduit in a spiral or helical pattern, as depicted in FIG. 2. As can be seen from an examination of FIG. 2, the ports 202, 204, 212, 214, 216, 222, 224 extend from the exterior wall 226 of the conduit 126 to the interior wall 228 (FIG. 2B) of the conduit 126. The ports are disposed at discrete locations about the flowpath 128 (FIG. 1)

and along the length of the conduit 126 in a spiral or helical pattern to provide both angular and longitudinal separation between individual ports. FIG. 2A shows the conduit 126 with both the visible ports 202, 204, 212, 216, 222, 224 and the obstructed ports 206, 208, 210, 218, 220 shown (the obstructed ports 206, 208, 210, 218, 220 are shown in phantom). The ports have a diameter D1. Due to the spiral or helical arrangement depicted, the ports are positioned so that the center point of each port is disposed on a distinct traverse plane of the conduit (i.e., a plane that is perpendicular to the length of the conduit and passes through the center of the conduit). The ports are also positioned so that a longitudinal, diametrical plane of the conduit (i.e., a plane that is parallel to the length of the conduit and passes through the center of the conduit) passing through the center point of each port is not coplanar with a longitudinal, diametrical plane of the conduit passing through the center point of a longitudinally adjacent port (i.e., a port that immediately precedes or follows the port along the longitudinal axis of the conduit). Thus, while the longitudinal, diametrical plane of the conduit 126 passing through the center point 203 of port 202 is coplanar with the longitudinal, diametrical plane of the conduit 126 passing through the center point (not shown) of port 208, the ports are not longitudinally adjacent because ports 204 and 206 lie between ports 202 and 208 on the longitudinal axis of the conduit 126 (i.e., ports 204 and 206 immediately follow port 202 or precede port 208 along the longitudinal axis of the conduit 126).

In the particular arrangement depicted in FIG. 2A, the transverse plane passing through the center point 203 of port 202 is offset from the transverse plane passing through the center point 205 of port 204 by a distance L1. The distance L1 can be any suitable distance, but in certain possibly preferred embodiments, the distance L1 is equal to about 30% to about 50% (e.g., about 35%) of the port diameter D1. In certain possibly preferred embodiments, the offset or distance between all of the ports on the conduit can be equal. Thus, as depicted in FIG. 2A, the distance L2 between the transverse plane passing through the center point 219 of port 218 and the transverse plane passing through the center point 221 of port 220 can be equal to distance L1.

Furthermore, as shown in the sectional view FIG. 2B, a longitudinal, diametrical plane passing through the center point 203 of port 202 is offset from a longitudinal, diametrical plane passing through the center point 205 of port 204 by an angle α. As explained above, the angle a can be any suitable angle. As depicted in FIG. 2B, the angle α is about 60 degrees. The angle a intercepts an arc A on the exterior wall 226 of the conduit 126, and the arc A can have any suitable length. In certain possibly preferred embodiments, the angle a intercepts an arc A on the exterior wall 226 of the conduit 126 having a length equal to about 175% to about 250% of the port diameter D1 (FIG. 2A).

FIG. 3 shows a perspective view of the conduit 126 having a plurality of nozzles 304 connected to ports 202, 204, 206, 208, 210, 212, 214, 216, 218, 220, 222, 224 (FIG. 2A) disposed about the conduit 126 in a spiral or helical pattern.

As depicted in FIG. 4, the conduit 126 comprises an exterior wall 226 defining the surface of the conduit and an interior wall 228 defining the flowpath 128 of the conduit 126. The flowpath 128 has a diameter D. A nozzle 304 is connected to port 202 extending from the exterior wall 226 to the interior wall 228 of the conduit 126. The nozzle 304 comprises a distal end 412, a proximal end 414, and a duct 416 connecting the distal and proximal ends of the nozzle. The distal end 412 of the nozzle 304 projects inward from the interior wall 228 of the conduit 126 a distance O and is disposed in the flowpath 128 of the conduit 126. Thus, as depicted in FIG. 4, the duct 416 and the flowpath 128 are in direct fluid communication.

The distal end 412 of the nozzle 304 can project into the flowpath 128 any suitable distance O. Typically, the distal end 412 of the nozzle 304 projects or extends inward from inner wall 228 of the conduit 126 a distance O equal to about 2 to about 50% (e.g., about 5 to about 45%) of the diameter D of the flowpath 128. In certain possibly preferred embodiments, the distal end 412 of the nozzle 304 projects or extends inward from the inner wall 228 of the conduit 126 a distance O equal to about 8 to about 18% of the diameter D of the flowpath 128 or a distance O equal to about 10% to about 15% (e.g., about 13%) of the diameter D of the flowpath 128.

As depicted in FIG. 5, the conduit 500 comprises an exterior wall 502 and an interior wall 504 defining the flowpath 506 of the conduit 500. A port (not shown) extends from the exterior wall 502 to the interior wall 504 of the conduit 500. A nozzle 508 is connected to the port (not shown) so that the distal end 510 of the nozzle 508 projects or extends into the flowpath 506 of the conduit 500. The nozzle can be connected to the port using any suitable means. As depicted in FIG. 5, a portion of the nozzle 508 is provided with pipe threads that communicate with pipe threads provided in the ports (FIGS. 2 and 2B).

A valve 512 is operatively connected to the proximal end (not shown) of the nozzle 508 so that the valve is in fluid communication with the nozzle and the flowpath 506. The valve can be connected to the nozzle using any suitable means. For example, the valve can be connected to the nozzle using threaded connections (e.g., pipe fittings), compression fittings, swage fittings, and the like. In certain other embodiments, a check valve or other similar device adapted to prevent backflow through the nozzle and into the valve can be fitted between the nozzle and the valve or onto the distal end of the nozzle. The valve 512 comprises at least one inlet 514 for the supply of additive(s) to the valve and can comprise an outlet (not shown) if the manifold is to be used in a system that employs a recirculating additive supply. The valve suitable for use in the manifold can be any suitable valve, such as a manually or automatically actuated two or three-way valve. Suitable valves include, but are not limited to, the valves described in U.S. Pat. No. 6,220,296 (Ragsdale et al.), U.S. Pat. No. 6,247,839 (Kochanowicz et al.), U.S. Pat. No. 6,250, 795 (Kochanowicz et al.), U.S. Pat. No. 6,316,053 (Ragsdale et al.), U.S. Pat. No. 6,345,646 (Ragsdale et al.), U.S. Pat. No. 6,378,734 (Ragsdale), and U.S. Pat. No. 6,541,531 (Ragsdale), each of which are herein incorporated by reference.

An alternative embodiment of the manifold is depicted in FIG. 6. As depicted in FIG. 6, the manifold 600 comprises an array of nozzle and valve assemblies 602, 604, 606, 608, 610, 612, 614, 616, 618, 620, 622, 624 connected to a plurality of ports 702, 704, 706, 708, 710, 712, 714, 716, 718, 720, 722, 724 (FIG. 7A) disposed about a flowpath 628 defined by a conduit 626. In FIG. 6, the nozzle and valve assemblies are connected to ports so that the nozzle and valve assemblies are disposed at a desired angle relative to the adjacent nozzle and valve assembly and the flowpath. Thus, as shown in FIG. 6, the nozzle and valve assembly 604 can be connected to port 704 (FIG. 7) so that it is disposed at an angle of about 63.5 degrees relative to the adjacent nozzle and valve assembly 602, which is connected to port 702 (FIG. 1), and the flowpath 628. While the manifold is depicted in FIG. 6 with the nozzle and valve assemblies set at a particular angle, the angle employed can be varied so long as the nozzle and valve assemblies do not physically interfere with each other. Thus, the angle between the nozzle and valve assemblies can be, for example, decreased as the physical dimensions of the nozzle and valve assemblies decreases or can be, for example, increased as the physical dimensions of the nozzle and valve assemblies increases.

As with the first embodiment of the manifold, the ports can be disposed about the flowpath and along the conduit in a spiral pattern, as depicted in FIG. 7. As can be seen from an examination of FIG. 7, the visible ports 702, 704, 712, 714, 716, 722, 724 extend from the exterior wall 726 of the conduit 626 to the interior wall 728 (FIG. 7B) of the conduit 626. The ports are disposed at discrete locations about the flowpath 628 (FIG. 6) and along the length of the conduit 626 in a spiral or helical pattern to provide both angular and longitudinal separation between individual ports. FIG. 7A shows the conduit 626 with both the visible ports 702, 704, 712, 716, 722, 724 and the obstructed ports 706, 708, 710, 718, 720 shown (the obstructed ports 706, 708, 710, 718, 720 are shown in phantom). The ports have a diameter D2. The ports are depicted as being positioned so that the center points of the ports are disposed on multiple traverse planes of the conduit (i.e., a plane that is perpendicular to the length of the conduit and passes through the center of the conduit). The ports are also positioned so that a longitudinal, diametrical plane of the conduit (i.e., a plane that is parallel to the length of the conduit and passes through the center of the conduit) passing through the center point of a port is not coplanar with a longitudinal, diametrical plane of the conduit passing through the center point of any other port.

In the particular arrangement depicted in FIG. 7A, the transverse plane passing through the center point 703 of port 702 is offset from the transverse plane passing through the center point 705 of port 704 by a distance L3. The distance L3 can be any suitable distance, but in certain possibly preferred embodiments, the distance L3 is equal to about 30% to about 50% (e.g., about 35%) of the port diameter D2. In certain possibly preferred embodiments, the offset or distance between all of the ports on the conduit can be equal. Thus, as depicted in FIG. 7A, the distance L4 between the transverse plane passing through the center point 719 of port 718 and the transverse plane passing through the center point 721 of port 720 can be equal to distance L3.

Furthermore, as shown in the sectional view FIG. 7B, a longitudinal, diametrical plane passing through the center point 703 of port 702 is offset from a longitudinal, diametrical plane passing through the center point 705 of port 704 by an angle β. As explained above, the angle β can be any suitable angle. As depicted in FIG. 7B, the angle β is about 63.5 degrees. By selecting an angle by which 360 degrees is not evenly divisible (i.e., dividing 360 degrees by the angle results in a remainder), the ports are offset such that no longitudinal, diametrical plane of the conduit (i.e., a plane that is parallel to the length of the conduit and passes through the center of the conduit) passing through the center point of a port is coplanar with a longitudinal, diametrical plane of the conduit passing through the center point of any other port, as noted above in the description of the manifold depicted in FIG. 7.

As shown in FIG. 7B, the angle β intercepts an arc B on the exterior wall 726 of the conduit 626, and the arc B can have any suitable length. In certain possibly preferred embodiments, the angle β intercepts an arc B on the exterior wall 726 of the conduit 626 having a length equal to about 175% to about 250% of the port diameter D2 (FIG. 7A).

The conduit of the manifold can be constructed from any suitable material. For example, the conduit can be constructed from a metal, such as aluminum, steel, stainless steel, and the like, or from a plastic material, such as polyvinyl chloride (PVC), polycarbonate, and the like. Furthermore, while the conduit has been depicted in the drawings as being substantially cylindrical or having a substantially circular cross section, the conduit can have any suitable cross section.

The manifold can be provided with any suitable means for fitting it to a suitable system, such as a system used in the manufacture of a polymer foam (e.g., a polyurethane foam). For example, as depicted in the drawings, the ends of the conduit can be threaded to provide a means for coupling the manifold to a suitable system. Alternatively, the ends of the conduit can be provided with flanged fittings to provide a means for coupling the manifold to a system.

In certain possibly preferred embodiments, the ports can be, as described and depicted above, disposed about the diameter and along the length of the conduit in a spiral or helical pattern. While the spiral or helical patterns depicted in FIGS. 1, 2, 2A, 6, 7, and 7A are left-handed spirals or helices (i.e., the ports progress along the length of the conduit in the counter-clockwise direction), the ports can be disposed about the diameter and along the length of the conduit in a right-handed spiral or helical pattern (i.e., the ports progress along the length of the conduit in the clockwise direction). Furthermore, it is contemplated that the ports can be disposed about the diameter and along the length of the conduit in other patterns. For example, the ports can be disposed along the length of the conduit on one or more transverse planes of the conduit, and, if more than one port is disposed on the same transverse plane of the conduit, then each port on the common plane can be placed at a separate point of an n-sided polygon (e.g., a regular, n-sided polygon), where n is a positive, odd integer, inscribed within the flowpath of the conduit. One particular example would be an arrangement in which two or more ports disposed on the same transverse plane of the conduit are placed at separate points of a regular pentagon inscribed within the flowpath of the conduit.

The manifold can comprise any suitable number of ports, nozzles, and valves. As will be understood by those of ordinary skill in the art, the number of ports, nozzles, and valves may vary based on the particular application for which the manifold is used. For example, in certain embodiments, the manifold can be used to introduce one or more colorants into a fluid (e.g., polyol) stream used in the manufacture of, for example, a polymer foam. In such an embodiment, the number of ports, nozzles, and valves (nozzle and valve assemblies) required could be dictated by the number of colorants needed to produce the desired range of colored foams. Furthermore, it is contemplated that accurate control of the introduction of colorant into the fluid stream at both high and low flow rates may require separate nozzle and valve assemblies for the same colorant. Thus, it is contemplated that in certain embodiments the manifold may comprise two or more nozzle and valve assemblies adapted to deliver the same colorant to the fluid stream, with each of the nozzle and valve assemblies being adapted to deliver the colorant to the fluid stream at different flow rates.

The invention further provides a system comprising a manifold according to the invention. In particular, the system comprises a manifold according to the invention, a valve control assembly adapted to selectively and independently open and close each of the valves on the manifold, and at least one additive supply adapted to deliver at least one additive to each of the valves on the manifold. An exemplary system according to the invention is depicted, for example, in FIG. 8. In the system depicted in FIG. 8, additive supplies $A_1$-$A_n$ are connected to the manifold so as to provide at least one additive to the valves on the manifold. As depicted, the system comprises at least one additive supply, denoted by $A_1$, but can comprise any suitable number of additive supplies, as represented by $A_n$, where n can be any positive integer. A valve control assembly comprising valve controls $V_1$-$V_n$, which are controlled by an appropriate control input, are connected to the manifold so as to allow for the selective and independent operation of the valves on the manifold. A fluid, such as reactant $R_1$, is also provided to the manifold so that it passes through the manifold, where the desired amount(s) and or combination of additive(s) are added thereto, and on to a mixing apparatus (such as a mixer or the suction side of a gear pump), where a second fluid, such as reactant $R_2$, is introduced. It is contemplated that the reactant $R_2$ can be combined with the reactant $R_1$ prior to the introduction of the reactant $R_1$ to the mixing apparatus. The combined reactant $R_1$, reactant $R_2$, and additive(s) then pass from the mixing apparatus to an appropriate system outlet.

In the above-described system, the valves on the manifold can be controlled by any suitable valve control assembly. For example, the valves can be controlled by a computer-controlled valve control assembly or comparable assembly so that the valves on the manifold are operated in such a way as to introduce the amount(s) and/or combination of additive(s) into the fluid stream necessary to produce a material having the desired additive loading.

In the above-described system, the additive(s) can be supplied to the valves on the manifold by any suitable additive supply. For example, the additive(s) can be directly pumped under pressure from an additive reservoir to the respective valve(s). In certain embodiments, the additive(s) can be supplied to the respective valve(s) on the manifold using a recirculating additive supply, in which the additive is continuously circulated thorough a loop leading from an additive reservoir to the valve and back to the additive reservoir.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A manifold suitable for introducing one or more additives into a fluid stream, the manifold comprising:
   (a) a conduit for conveying the fluid stream, the conduit having a length and a flowpath extending along the length thereof, the conduit comprising:
      (i) an exterior wall, the exterior wall defining a surface of the conduit,
      (ii) an interior wall, the interior wall defining a diameter of the flowpath, and
      (iii) a plurality of ports extending from the exterior wall to the interior wall of the conduit, each of the ports having a center point and being disposed at a discrete location about the diameter of the flowpath and along the length of the conduit such that the center points of the ports are disposed on two or more transverse planes of the conduit and no longitudinal, diametrical plane of the conduit passing through the center point of any one of the ports is coplanar with a longitudinal, diametrical plane of the conduit passing through the center point of a longitudinally adjacent port,
   (b) a plurality of corresponding nozzles, each nozzle connected to a respective port and having a distal end, a proximal end, and a duct connecting the distal and proximal ends thereof, the distal end of each nozzle projecting inward from the interior wall of the conduit and being disposed in the flowpath of the conduit to permit fluid communication between the duct and the flowpath, and
   (c) a plurality of corresponding valves, each valve being connected to a respective nozzle, each valve being in fluid communication with the duct of the respective nozzle and adapted to introduce at least one additive into the duct of the nozzle and into the flowpath of the conduit.

2. The manifold of claim 1, wherein the distal end of each nozzle projects inward from the inner wall of the conduit a distance equal to about 2% to about 50% of the diameter of the flowpath.

3. The manifold of claim 2, wherein the distal end of each nozzle projects inward from the inner wall of the conduit a distance equal to about 8% to about 18% of the diameter of the flowpath.

4. The manifold of claim 3, wherein the distal end of each nozzle projects inward from the inner wall of the conduit a distance equal to about 10% to about 15% of the diameter of the flowpath.

5. A system suitable for introducing one or more additives into a fluid stream, the system comprising:
   (a) the manifold of claim 3,
   (b) a valve control assembly, the valve control assembly being adapted to selectively and independently open and close each of the valves, and
   (c) at least one additive supply, the at least one additive supply being adapted to deliver at least one additive to each of the valves.

6. The manifold of claim 1, wherein the plurality of ports are disposed about the diameter of the flowpath and along the length of the conduit in a helical pattern.

7. The manifold of claim 6, wherein the ports have a port diameter, wherein a transverse plane passing through the center point of each port is offset from a transverse plane passing through the center point of a longitudinally adjacent port by a distance equal to about 30% to about 50% of the port diameter, wherein a longitudinal, diametrical plane of the conduit passing through the center point of each port is offset from a longitudinal, diametrical plane of the conduit passing through the center point of a longitudinally adjacent port by an angle, and wherein the angle intercepts an arc on the surface of the conduit having a length equal to about 175% to about 250% of the port diameter.

8. A system suitable for introducing one or more additives into a fluid stream, the system comprising:
   (a) the manifold of claim 7,
   (b) a valve control assembly, the valve control assembly being adapted to selectively and independently open and close each of the valves, and
   (c) at least one additive supply, the at least one additive supply being adapted to deliver at least one additive to each of the valves.

9. A system suitable for introducing one or more additives into a fluid stream, the system comprising:
   (a) the manifold of claim 6,
   (b) a valve control assembly, the valve control assembly being adapted to selectively and independently open and close each of the valves, and
   (c) at least one additive supply, the at least one additive supply being adapted to deliver at least one additive to each of the valves.

10. The manifold of claim 1, wherein the manifold comprises a plurality of sets of ports.

11. The manifold of claim 10, wherein the manifold comprises a first set of six ports disposed about the diameter of the flowpath and along the length of the conduit in a first helical pattern and a second set of six ports disposed about the diameter of the flowpath and along the length of the conduit in a second helical pattern, each of the sets comprising a first port and a last port, wherein a longitudinal, diametrical plane of the conduit passing through the center point of each port in the first or second set is offset from a longitudinal, diametrical plane of the conduit passing through the center point of a longitudinally adjacent port in the same set by an angle of about 60 degrees, and wherein a longitudinal, diametrical plane of the conduit passing through the center point of the last port of the first set is offset from a longitudinal, diametrical plane of the conduit passing through the center point of the first port of the second set by an angle of about 80 to about 90 degrees.

12. A system suitable for introducing one or more additives into a fluid stream, the system comprising:
   (a) the manifold of claim 11,
   (b) a valve control assembly, the valve control assembly being adapted to selectively and independently open and close each of the valves, and
   (c) at least one additive supply, the at least one additive supply being adapted to deliver at least one additive to each of the valves.

13. A system suitable for introducing one or more additives into a fluid stream, the system comprising:
   (a) the manifold of claim 10,
   (b) a valve control assembly, the valve control assembly being adapted to selectively and independently open and close each of the valves, and
   (c) at least one additive supply, the at least one additive supply being adapted to deliver at least one additive to each of the valves.

14. A system suitable for introducing one or more additives into a fluid stream, the system comprising:
   (a) the manifold of claim 1,
   (b) a valve control assembly, the valve control assembly being adapted to selectively and independently open and close each of the valves, and
   (c) at least one additive supply, the at least one additive supply being adapted to deliver at least one additive to each of the valves.

15. A manifold suitable for introducing one or more additives into a fluid stream, the manifold comprising:
   (a) a conduit for conveying the fluid stream, the conduit having a length and a flowpath extending along the length thereof, the conduit comprising:
      (i) an exterior wall, the exterior wall defining a surface of the conduit,
      (ii) an interior wall, the interior wall defining a diameter of the flowpath, and
      (iii) a plurality of ports extending from the exterior wall to the interior wall of the conduit, each of the ports having a center point and being disposed at a discrete location about the diameter of the flowpath and along the length of the conduit such that no longitudinal, diametrical plane of the conduit passing through the center point of any one of the ports is coplanar with a longitudinal, diametrical plane of the conduit passing through the center point of any other port,
   (b) a plurality of corresponding nozzles, each nozzle connected to a respective port and having a distal end, a proximal end, and a duct connecting the distal and proximal ends thereof, the distal end of each nozzle projecting inward from the interior wall of the conduit and being disposed in the flowpath of the conduit to permit fluid communication between the duct and the flowpath, and
   (c) a plurality of corresponding valves, each valve being connected to a respective nozzle, each valve being in fluid communication with the duct of the respective nozzle and adapted to introduce at least one additive into the duct of the nozzle and into the flowpath of the conduit.

16. The manifold of claim 15, wherein the distal end of each nozzle projects inward from the inner wall of the conduit a distance equal to about 2% to about 50% of the diameter of the flowpath.

17. The manifold of claim 16, wherein the distal end of each nozzle projects inward from the inner wall of the conduit a distance equal to about 8% to about 18% of the diameter of the flowpath.

18. The manifold of claim 17, wherein the distal end of each nozzle projects inward from the inner wall of the conduit a distance equal to about 10% to about 15% of the diameter of the flowpath.

19. A system suitable for introducing one or more additives into a fluid stream, the system comprising:
   (a) the manifold of claim 18,
   (b) a valve control assembly, the valve control assembly being adapted to selectively and independently open and close each of the valves, and
   (c) at least one additive supply, the at least one additive supply being adapted to deliver at least one additive to each of the valves.

20. The manifold of claim 15, wherein the plurality of ports are disposed about the diameter of the flowpath and along the length of the conduit in a helical pattern.

21. A system suitable for introducing one or more additives into a fluid stream, the system comprising:
(a) the manifold of claim 20,
(b) a valve control assembly, the valve control assembly being adapted to selectively and independently open and close each of the valves, and
(c) at least one additive supply, the at least one additive supply being adapted to deliver at least one additive to each of the valves.

22. A system suitable for introducing one or more additives into a fluid stream, the system comprising:
(a) the manifold of claim 15,
(b) a valve control assembly, the valve control assembly being adapted to selectively and independently open and close each of the valves, and
(c) at least one additive supply, the at least one additive supply being adapted to deliver at least one additive to each of the valves.

* * * * *